US009956703B2

(12) United States Patent
Bookbinder et al.

(10) Patent No.: US 9,956,703 B2
(45) Date of Patent: May 1, 2018

(54) METHODS FOR CLEANING DIES

(75) Inventors: Dana Craig Bookbinder, Corning, NY
(US); Yuk Fung Chan, Brooklyn, NY
(US); Lung-Ming Wu, Horseheads, NY
(US)

(73) Assignee: Corning Incorporated, Corning, NY
(US)

( * ) Notice: Subject to any disclaimer, the term of this
patent is extended or adjusted under 35
U.S.C. 154(b) by 969 days.

(21) Appl. No.: 12/346,088

(22) Filed: Dec. 30, 2008

(65) Prior Publication Data

US 2010/0164131 A1 Jul. 1, 2010

(51) Int. Cl.
*B29C 33/72* (2006.01)
*B28B 7/38* (2006.01)
*B08B 7/00* (2006.01)
*B08B 9/00* (2006.01)
*B29C 47/00* (2006.01)
*B29C 47/08* (2006.01)

(52) U.S. Cl.
CPC ............ *B28B 7/386* (2013.01); *B08B 7/0014*
(2013.01); *B08B 9/00* (2013.01); *B29C*
*47/0009* (2013.01); *B29C 47/0028* (2013.01);
*B29C 47/0877* (2013.01)

(58) Field of Classification Search
CPC ..... B08B 7/0014; B08B 9/00; B29C 47/0877;
B29C 47/0009; B29C 47/0028; B28B
7/386
USPC ............ 134/6, 8, 22.1, 19, 22.18, 26, 30, 42
See application file for complete search history.

(56) References Cited

U.S. PATENT DOCUMENTS

| 3,084,075 | A | 4/1963 | Doan et al. |
| 3,798,064 | A | 3/1974 | Amoser ............................ 134/7 |
| 6,344,078 | B1 | 2/2002 | Beall et al. .................... 106/285 |
| 6,803,087 | B2 | 10/2004 | Brew et al. .................... 428/116 |
| 7,001,861 | B2 | 2/2006 | Beall et al. .................... 501/128 |
| 7,025,070 | B2 * | 4/2006 | Sato ........................... 134/22.14 |
| 7,040,327 | B2 | 5/2006 | Wada et al. .................. 134/22.1 |
| 2001/0025072 | A1 * | 9/2001 | Negi et al. ..................... 524/400 |
| 2002/0187912 | A1 | 12/2002 | Waldrop ....................... 510/403 |
| 2002/0187913 | A1 * | 12/2002 | Waldrop ....................... 510/403 |
| 2003/0221707 | A1 * | 12/2003 | Blanton et al. .................... 134/7 |
| 2005/0081588 | A1 | 4/2005 | Twigg et al. ...................... 72/38 |
| 2008/0018009 | A1 | 1/2008 | Ciliske et al. .................. 264/39 |

FOREIGN PATENT DOCUMENTS

| CN | 201154520 Y | 11/2008 | |
| DE | 4132821 A1 | 4/1992 | |
| EP | 0937567 | 2/2000 | ............ B29C 47/08 |
| GB | 2 001 997 | 2/1979 | |
| JP | 47026846 B | 7/1972 | |
| JP | 58193129 A | * 11/1983 | |

(Continued)

OTHER PUBLICATIONS

Derwent Abstract of JP 61078704.*

(Continued)

*Primary Examiner* — Alexander Markoff

(57) ABSTRACT

A method for cleaning batch material from an extrusion die includes introducing at least one gel composition into the die in a manner sufficient to purge the batch material from the die. After the batch material is purged from the die, the die can be treated further so that the gel composition is liquefied and flows from the die.

16 Claims, 2 Drawing Sheets

(56) References Cited

FOREIGN PATENT DOCUMENTS

| | | | |
|---|---|---|---|
| JP | 2008155793 A | 7/2008 | |
| JP | 4155793 B2 | 9/2008 | |
| KR | 10-0818454 | 4/2008 | ............. B29C 33/72 |

OTHER PUBLICATIONS

MakerBot Water Soluble PVE.*
Cold Water Soluble PVA Film.*
Aicello Water Soluble Film.*
Water Soluble PVA Filament.*
Corresponding China Application No. 200980156031 .3, dated Jul. 29, 2011 , Office Action.
Japanese Application No. 2011-544503, filed Jun. 30, 2011; Office Action dated Sep. 3, 2013.

* cited by examiner

METHODS FOR CLEANING DIES

BACKGROUND AND SUMMARY

The present disclosure relates to methods for cleaning extrusion dies such as those used in forming inorganic materials.

Extrusion dies are used in processes for extrusion-forming materials into bodies or articles of a given extrusion-forming material ("batch material"). Extrusion dies may contain passages or channels of relatively minute cross-sectional area, which extend through the dies, and through which the batch material passes. After the end of a production run the extrusion dies are generally cleaned and inspected. If the batch material is not removed from the extrusion passage and channels, the batch material can harden and become set in the die, thereby damaging the die and/or resulting in poor quality of the extruded form. Additionally, extrusion dies may require cleaning prior to changing the batch material or upon shutting down the extruder to avoid damage to the dies. Examples of extrusion dies are disclosed in U.S. Pat. No. 6,803,087, which is incorporated herein by reference.

In the past, dies for making ceramic honeycombs for diesel and automotive substrates were cleaned with high-pressure water washers (such as, for example, those having approximately 1000-3000 psi nozzle pressure). While water washers had been used successfully for several years to remove the ceramic batch, the water pressure washers had to be run for long cycles to achieve adequate cleaning of the dies. Some cycles took several hours, which may not be acceptable in certain manufacturing environments where the turn-around time on the die wash may affect production.

A wax press method was then developed to clean extrusion dies. In that method, wax "cookies" were pressed into a batch material filled die, thereby purging the batch material from the slots and holes of the die. The wax remaining in the die was then melted from the die leaving the die free of batch material. While the wax press method quickly removed the batch material from the die, it had several disadvantages. For example, the wax was expensive, the wax left a greasy residue on the die, and melting the residual wax from the die was time consuming. Additionally, the wax required costly and time consuming environmental disposal.

Moreover, in the wax press method, to completely clean the wax from the die, another step of cleaning was required using solvents such as hexane or methylene chloride, which are flammable and/or toxic. The wax residue could also be removed by heating the die to 600° C. to burn the wax off the die; however, such high temperatures can damage the die. Complete removal of the wax is particularly important nevertheless. For example, the die must be completely clean for instances of reapplication of chemical vapor deposition ("CVD") wear resistant coatings on the die.

U.S. Pat. No. 3,084,075, incorporated herein by reference, discloses, inter alia, a method for cleaning dough-extruding dies comprising pressing or extruding a solid waxy material through a die to remove dough residue, and then removing the residual wax using water heated to a temperature above the melting point of the wax.

The wax press method was eventually abandoned and replaced, again with high-pressure water washers which are currently in use for cleaning extrusion dies, such as diesel and automotive thin-wall honeycomb dies, for example. As stated above, while water washers have been used successfully for several years, as die technology improves thereby allowing for thinner slots and holes, and as dies become thicker in order to produce larger diameter honeycombs, the water washers must be run for even longer cycles to achieve adequate cleaning of the dies. Some cycles can take several hours, which may not be acceptable in certain manufacturing environments where the turn-around time on the die wash may affect production. Moreover, the high pressure of the washer may cause bending of the die pins or other damage to the die.

U.S. Pat. No. 7,040,327, incorporated herein by reference, discloses, inter alia, a variation on the high-pressure water washing method that first heats the die to 200-500° C. to burn out the organic binder in the ceramic and then places the die in a high-pressure washing cycle. While this variation potentially speeds the washing cycle, the overall cycle of die cleaning remains slow as the die first has to be heated and held for a sufficient time, for example 4-24 hours, to burn out the organic binder. In addition, some ceramic pastes when heated to those temperatures can set up in the die (like cement) and become even more difficult or impossible to remove from the die.

The inventors have now discovered time and cost-effective methods for cleaning dies that are, in various embodiments, capable of cleaning the dies without damaging them. According to various embodiments, the present disclosure relates to methods for cleaning extrusion dies, such as those used in forming inorganic materials.

Although the present invention may obviate one or more of the above-mentioned disadvantages, it should be understood that some aspects of the invention might not necessarily obviate one or more of those disadvantages.

SUMMARY

In accordance with the detailed description and various exemplary embodiments described herein, the present disclosure relates to methods for cleaning extrusion dies, such as, for example, those used in forming inorganic materials. In various exemplary methods, a gel composition is introduced into the die in a manner sufficient to purge the batch material from the die. In certain embodiments, the die may then be subsequently treated and/or rinsed. In at least one exemplary embodiment, the gel composition may be water soluble, water swellable, or water dispersible. In further exemplary embodiments, the present disclosure relates to methods for cleaning extrusion dies used in forming ceramic materials comprising using a water soluble, water swellable, or water dispersible gel composition to purge the ceramic batch from the die and rinsing the die with hot water to melt and/or flush the residual gel.

BRIEF DESCRIPTION OF THE DRAWINGS

The accompanying drawings are included to provide a further understanding of the invention, and are incorporated in and constitute a part of this specification. The drawings are not intended to be restrictive of the invention as claimed, but rather are provided to further illustrate at least one embodiment of the invention and, together with the description, serve to explain the principles of the invention.

DETAILED DESCRIPTION

Figure 1:
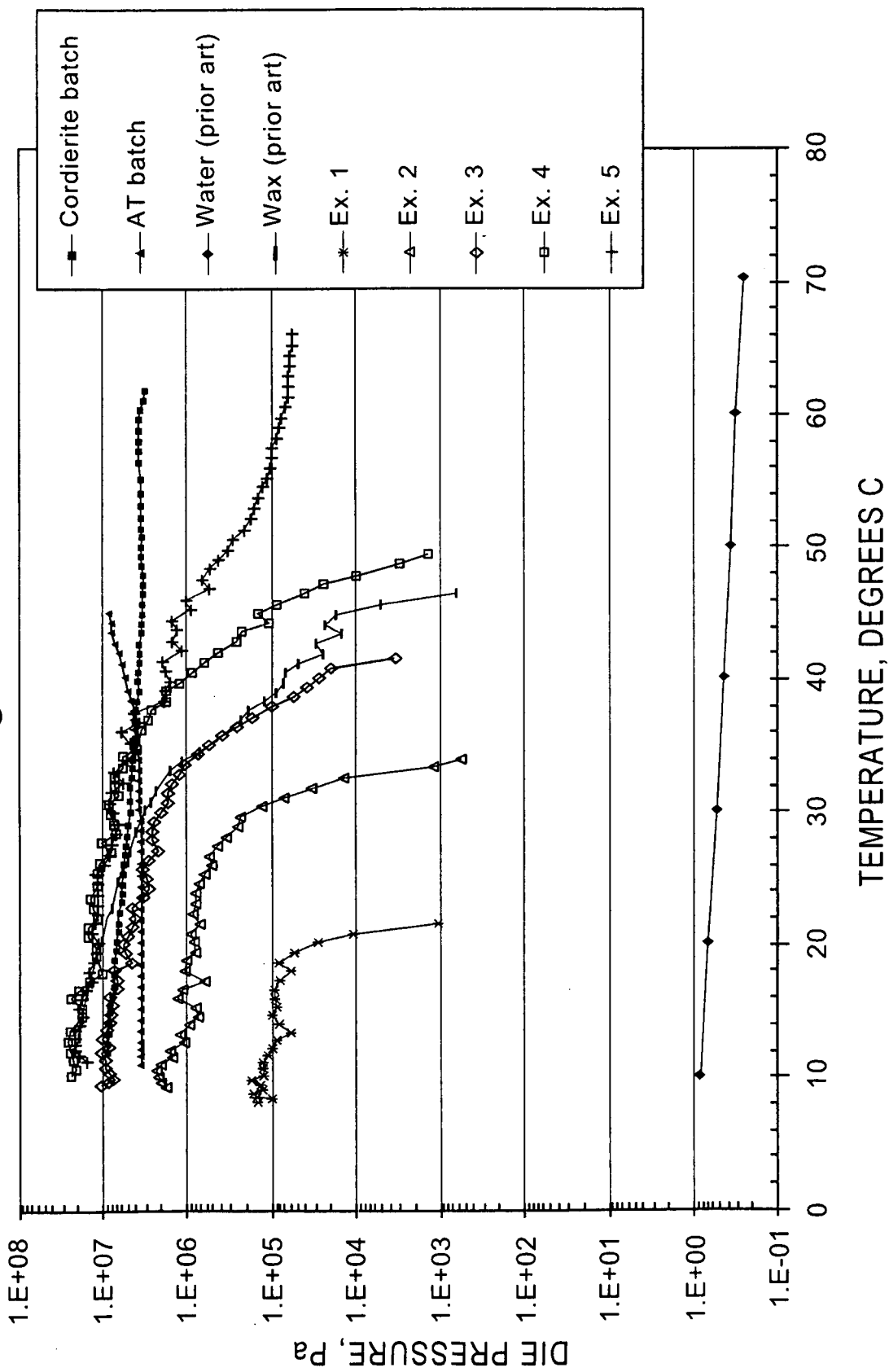
FIG. 1 is a plot of die pressure as a function of temperature for ceramic batch pastes and gels according to the present disclosure to clean the extrusion dies.

It is to be understood that both the foregoing general description and the following detailed description are exemplary and explanatory only and are not restrictive of the invention, as claimed. Other embodiments of the invention will be apparent to those skilled in the art from consideration of the specification and practice of the invention disclosed herein. It is intended that the specification and examples be considered as exemplary only, with a true scope and spirit of the invention being indicated by the claims.

The present disclosure relates to methods for cleaning extrusion dies, such as those used in forming inorganic materials, for example methods comprising introducing a gel composition into a die in a manner sufficient to purge the batch material from the die. As used herein, the term "purge," and variations thereof, means to remove substantially all of the batch material from the die, for example by pressing or otherwise forcing the batch material through the die.

In various embodiments, the methods may further comprise treating and/or rinsing the die. In at least one embodiment, the gel composition may be water soluble, water swellable, or water dispersible. In at least one exemplary embodiment, the present disclosure relates to methods for cleaning extrusion dies used in forming ceramic materials comprising using a water soluble, water swellable, or water dispersible gel composition to purge the ceramic batch from the die, rinsing the die with hot water to melt the gel composition, and flushing the die with hot water to clean it. In at least one exemplary embodiment, the present disclosure relates to methods for cleaning extrusion dies used in forming ceramic materials comprising using a water soluble, water swellable, or water dispersible gel composition to purge the ceramic batch from the die, and then substantially lowering the viscosity of the gel such that the gel is removed from the die with low pressure.

In at least certain embodiments, the presently disclosed methods produce a substantially clean die. As used herein, the term "substantially clean," and variations thereof, means that upon optical inspection, the die appears free of batch material and the water soluble gel composition. Optical inspection typically involves backlighting the die wherein a person or a camera/computer system observes the die channels for dimensions associated with the presence or absence of a blockage. In various exemplary embodiments, a substantially clean die will not contain an amount of residual batch material that will adversely affect the quality of the extruded material when the die is used again.

In various exemplary methods of the present disclosure, the die in need of cleaning is used to extrude an inorganic batch material, which may be chosen from, but is not limited to metal, glass, and ceramic batches. In at least one exemplary embodiment, the die is used for extruding a ceramic batch, for example, to make ceramic honeycomb structures. The batch material may also contain organic materials, such as, but not limited to, extrusion aids, pore formers, and lubricants.

In various exemplary methods of the present disclosure, the gel composition may comprise at least one gelling agent. The gelling agent may be any gelling agent known to those of skill in the art. The gelling agent may, for example, be chosen from at least one water swellable gelling agent. In the present disclosure, "water swellable gelling agent," and variations thereof, means one or more compounds capable of dissolving, dispersing, and/or swelling in water to form a gel. For example, in various embodiments of the present disclosure, water swellable gelling agents include, but are not limited to, polymeric gels, swelling surfactants, and starch-based gels. Non-limiting examples of water swellable gelling agents include gelatin, agar, carrageenan, gellan gum, xanthan gum, pectin, starch (e.g., potato, corn, rice, wheat, etc.), methyl cellulose, hydroxypropyl methylcellulose, polyacrylic acid, alkali and ammonium salts of polyacrylic acid (known as super absorbent polymers), polyvinyl alcohol-borate complex, and polyethyleneoxide-polypropyleneoxide copolymers. In at least one embodiment of the present disclosure, the at least one water swellable gelling agent is 8A Technical Gelatin from Milligan & Higgins (Johnstown, N.Y.).

The at least one gelling agent may, in various exemplary embodiments, be selected such that it may form a solid, semi-solid, or gel-like composition for introduction into the die and to purge the batch material. The gelling agent may, in various embodiments, be further selected such that, in response to a change in conditions after the purge, such as, for example, heating or cooling, it transitions to a less viscous, fluid-like form and the gel composition flows from the die on its own or with little effort. For example, in one embodiment of the present disclosure, the at least one gelling agent is water swellable and may be thermoreversible (upon cooling or heating), ionically reversible, or even ultraviolet degradable. In another exemplary embodiment of the present disclosure, a water swellable gelling agent is selected such that the viscosity of the gel composition can be lowered by several orders of magnitude by changing the ionic strength of the gel composition by salting out with, for example, the addition of sodium chloride.

According to various embodiments, the gel composition may further comprise at least one solvent. The solvent may be chosen from any solvent useful for preparing a gel composition, such as, for example, water and organic solvents. In at least one exemplary embodiment, the solvent is water. The appropriate solvent may easily be determined by those skilled in the art based on, for example, the desired properties of the gel composition and the specific gelling agent chosen.

In various exemplary embodiments of the disclosure, the at least one gelling agent may be present in an amount ranging from 1-99 wt. %, such as, for example, from 20-70 wt. %, or even from 25-50 wt. %, of the gel composition. The appropriate amount of gelling agent is easily determined by those of skill in the art, for example based on the desired properties of the gel composition.

The gel composition may, in various exemplary embodiments, be rigid and viscous enough to push the batch material through the die, without channeling through the batch material, which would leave residual batch material in the die. In at least one exemplary embodiment, the gelling agent may be present in an amount such that the viscosity of the gel composition is approximately the same as or similar to that of the batch material.

The viscosity may be measured by any technique known to those of skill in the art. As a non-limiting example, a capillary viscosity characterization method may be used to determine and compare the viscosity of the gel compositions and batch materials discussed herein. According to that method, the materials are characterized at a shear rate of 10/s over a temperature range of approximately 10° C. to 70° C. at 1° C./min ramp rate. Similar results have been obtained herein using shear rates from approximately 1.5/s to 800/s by using piston speeds from 0.05 to 27.1 mm/minute in the viscometer equipment described below.

This characterization method is used to determine a material's ability to flow under applied shear stress, i.e., shear experienced while pumping/purging the material through a die (e.g., a honeycomb die used to extrude a ceramic batch/paste). The capillary viscosity test may be conducted using a Rosand RH-7 dual barrel capillary viscometer (Malvern Instruments Inc., Southborough Mass.) with the piston speed of 0.333 mm/min to achieve an apparent shear rate, herein called shear rate, of 10/s. The viscometer may have a barrel/plunger diameter of 15 mm and a sample chamber within the barrel of approximately 250 mm, and utilize capillary dies (Part # DA-1.0-16-180-15 and # DA-1.0-0.25-180-15), having lengths of 16 mm and 0.25 mm, respectively, a diameter of 1 mm, and entry angle of 180 degrees, and an outside diameter of 15 mm. A 10,000 psi pressure transducer may be used. The instrument barrel may be temperature controlled using an external water circulating bath. The die pressure, with Bagley correction and viscosity at a shear rate of 10/s, may be recorded and plotted as a function of temperature. Calculations for the viscosity of the ceramic batches may be performed using a shear rate of 10/s in order to obtain an apparent viscosity, herein called viscosity, in order to compare ceramic batch pastes to the gels, wax and water. Pressure data may be reported in Pascal (Pa) units, and viscosity data may be reported in Pascal-seconds (Pa-s).

In at least one exemplary embodiment of the present disclosure, the ratio of the viscosity of the gel composition to that of the batch material ranges from 0.02 to 100. For example, the ratio of the viscosity of the gel composition to that of the batch material may, in various embodiments, range from 0.02 to 1.0, from 1 to 2, or from 2 to 20.

In at least one exemplary embodiment of the present disclosure, the viscosity of the gel composition used to purge a ceramic batch from the die is greater than 100 Pa-s, for example 140 Pa-s. In another exemplary embodiment, the viscosity of the gel is greater than 1000 Pa-s, for example 1500 Pa-s. In at least one other exemplary embodiment, the viscosity of the gel composition is greater than 10,000 Pa-s, for example 20,000, 100,000, and 500,000 Pa-s. It will be apparent to those skilled in the art that the upper useful limit in viscosity for a gel as a purge material may depend on, for example, the design of the extrusion die, e.g., a small diameter and relatively thick die (50 mm diameter×50 mm thick) with large slots for the ceramic batch (e.g., 1 mm) can withstand more pressure than a large diameter die (200 mm×25 mm thick) having 0.1 mm slots.

According to various exemplary embodiments, the gel composition may further comprise any additional component known to those skilled in the art useful for making gel compositions. By way of example, the gel composition may further comprise at least one adjuvant, such as at least one antimicrobial agent such as butylated hydroxytoluene and potassium sorbate, fillers, pigments, and firming agents, including propylene glycol and metal salts. The gel may be cooled or frozen (e.g., cooled to a temperature less than 0° C., such as −20° C.) in order to prevent microbial growth, then thawed (e.g., heated to a temperature of about room temperature, such as 15-20° C.) just prior to use.

According to various exemplary embodiments, the gel composition may be in a solid, semi-solid, or gel-like form. For example, it may be in the form of a disk, patty, or pancake which approximately matches the size of the extrusion die. It may also be in the form of pellets or beads. In various embodiments, the gel composition form is pressed through the orifice of the die. In various embodiments of the present disclosure, the gel composition may be in the form of a patty and may be about the same thickness as the die length. In addition, the amount of gel composition used may be of the same volume or greater than the volume of the die orifices or channels.

Any method known to those skilled in the art for introducing the gel composition into the die in a manner sufficient to purge the batch material from the die may be used. By way of example, the gel composition may be pressed or pushed through the die, for example, with an extruder or hydraulic press, thereby forcing the batch material out.

In various embodiments, once the gel composition is introduced into the die and the batch material is purged, the die may be further treated such that any gel composition remaining in the die is removed. Any such residual gel composition may be removed by any treatment method known to those skilled in the art. By way of example, conditions may be changed such that the gel composition transitions from its solid or gel-like form to a more fluid-like state capable of flowing from the die on its own or with little effort. As used herein, the terms "liquid," "liquefies," "fluid-like," and variations thereof, mean that the gel composition is substantially free-flowing or flows with minimal force or effort.

According to various exemplary embodiments, condition changes include, but are not limited to, temperature changes and exposure to radiation such as ultraviolet light. For example, in one embodiment of the present invention, a thermally reversible gelling agent is selected wherein the resulting gel composition is water soluble and is a formed solid or gel at room temperature, which is pushed through the die, thereby purging the batch. In another exemplary embodiment of the present disclosure, a condition change may be the addition of sodium chloride, which can lower the viscosity of the gel composition by several orders of magnitude by changing the ionic strength of the gel composition, as discussed above. Then, the residual gel composition is heated in the die using warm water, and the gel composition liquefies and flows from the die.

The capillary viscometer characterization method described above may also be used to determine the viscosity at which the gel may liquefy and independently or with little force flow from the die. In at least one exemplary embodiment, the viscosity of the gel composition, after purging the batch from the die, could be lowered to less than 1000 Pa-s, for example 800 Pa-s, in order for the gel to liquefy and flow from the die. In another exemplary embodiment, the viscosity of the gel composition could be lowered to less than 100 Pa-s, for example 80 Pa-s, in order for the gel to liquefy and flow from the die. In at least one further exemplary embodiment, the viscosity of the gel composition could be lowered to less than 10 Pa-s, for example 5 Pa-s, in order for the gel to liquefy and flow from the die. In yet a further exemplary embodiment, the viscosity of the gel composition could be lowered to less than 1 Pa-s, for example 0.8 Pa-s, in order for the gel to liquefy and flow from the die.

Finally, any remaining amounts of the gel composition may be removed by any method known to those of skill in the art, such as, for example, by rinsing the die with a solvent either during or subsequent to the further treatment described above. In at least one embodiment, the remaining gel composition is removed by rinsing the die with water. By way of example, the gel composition may be rinsed out of the die in a hot water wash cycle, such as that of low pressure water from a sink faucet where the water temperature is approximately 50 to 60° C., or a high pressure washer using water at approximately 50 to 55° C. The wash time will vary based, for example, upon the die design, gel composition, water pressure, and manner of washing, among other factors. The hot water wash may, in certain embodiments, take only several minutes, and in at least one embodiment, may take less than two minutes. In various embodiments where the remaining gel composition is removed by rinsing with a solvent, an appropriate solvent may easily be chosen by those skilled in the art based on, for example, the amount and type of gel composition to be removed.

Unless otherwise indicated, all numbers used in the specification and claims are to be understood as being modified in all instances by the term "about," whether or not so stated. It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein the use of "the," "a," or "an" means "at least one," and should not be limited to "only one" unless explicitly indicated to the contrary. Thus, for example, the use of "the gelling agent" or "a gelling agent" is intended to mean at least one gelling agent.

Other embodiments of the invention will be apparent to those skilled in the art from consideration of the specification and practice of the invention disclosed herein. It is intended that the specification and examples be considered as exemplary only, with a true scope and spirit of the invention being indicated by the claims.

EXAMPLES

The following examples are not intended to be limiting of the invention as claimed.

Examples 1-5

Five gel compositions (examples 1-5) were characterized by a capillary viscometer described above to determine and compare the die pressure and viscosity of the gels as a function of temperature. The compositions of the gel compositions are set forth in Table 1 below. Example 5, which is comprised of "Gel 79672," is a "gummi bear" candy comprising high fructose corn syrup, sugar, and gelatin. It is available as product code 79672(c) from Wegman's Foods, Corning, N.Y.

Two ceramic pastes, which are used to make ceramic honeycombs by employing a die, were also characterized by capillary viscosity to determine and compare the viscosity of the pastes as a function of temperature. The first ceramic paste, which is identified as "AT batch," was an alumina titanate ceramic batch paste (a) prepared as described in U.S. Pat. No. 7,001,861, which is incorporated herein by reference. The second ceramic paste, which is identified as "Cordierite batch," was a cordierite ceramic batch paste (b) prepared as described in U.S. Pat. No. 6,344,078, which is incorporated herein by reference.

In addition the comparative cleaning materials, wax (BW558 microcrystalline wax, Blended Waxes, Inc., Oshkosh, Wis.), and water, were also characterized. The composition of the ceramic pastes and comparative materials used are also shown in Table 1.

TABLE 1

| Sample Name | | | | | |
|---|---|---|---|---|---|
| AT batch | Alumina titanate ceramic batch paste (a) | | | | |
| Cordierite batch | Cordierite ceramic batch paste (b) | | | | |

| | Composition (weight percent) | | | | |
|---|---|---|---|---|---|
| | water | gelatin 8A | sugar | Gel 79672(c) | wax |
| Wax (comparative) | 0.0 | 0.0 | 0.0 | 0.0 | 100.0 |
| Water (comparative) | 100.0 | 0.0 | 0.0 | 0.0 | 0.0 |
| Example 1 | 90.0 | 10.0 | 0.0 | 0.0 | 0.0 |
| Example 2 | 77.7 | 19.4 | 2.9 | 0.0 | 0.0 |
| Example 3 | 60.0 | 40.0 | 0.0 | 0.0 | 0.0 |

TABLE 1-continued

| Example 4 | 25.0 | 25.0 | 50.0 | 0.0 | 0.0 |
| Example 5 | na | na | na | 100.0 | 0.0 |

A capillary viscosity characterization method was used to determine and compare the viscosity of the materials identified in Table 1 as described above.

The data in FIG. 1 shows the capillary die pressure vs. temperature for the ceramic batch materials ("AT batch" and "Cordierite batch") used to make a ceramic honeycomb body by extrusion of these materials through a die. These materials have a relatively flat die pressure of about $5 \times 10^6$ to $1 \times 10^7$ Pa across a temperature range of about 10 to 60° C. The data in the plot shows the viscosity of the two comparative cleaning materials (wax and water) to remove the ceramic batch from the die. The capillary die pressure of water was calculated from the literature values for the viscosity of water using the following equation from the literature for pressure of a fluid flowing through a straight pipe: Pressure=4×(die length/die diameter)×Viscosity× Shear Rate, where the die had a length and diameter of 16 and 1 mm, respectively, and a shear rate of 10/s was used.

First, the die pressure of water is approximately 0.5 to 1 Pa, while the ceramic batch has a die pressure of approximately 5-10 million times greater than water. Thus it can be readily seen why water, even when using a high pressure washer, is slow to clean a die filled with ceramic paste. The wax is an alternative material for cleaning ceramic paste from a die, as described above. The data shows that the wax has a die pressure of approximately 6,000,000 Pa at 25° C. and drops to about 1,000 Pa at about 45° C.; thus, this characterization method indicates how the wax is able to purge the ceramic batch from the die and then be melted out of the die.

The data in FIG. 1 also shows the die pressure verses temperature results for the inventive gel compositions set forth in Table 1. It can be seen from the data that all of the gels have a relatively high die pressure at the lower temperatures and die pressure drops significantly as the temperature is raised. Example 2 has a die pressure of approximately 1,000,000 Pa at 25° C., and this drops to approximately 500 Pa at 35° C. While the die pressures from the gels of Examples 1 and 2 are not as high as the ceramic batch materials also shown in FIG. 1, they can be effective cleaning agents for removing the ceramic paste from the die. They can then be melted and/or flushed from the die by raising the temperature, for example by running the die under 50° C. flowing water. Examples 3-5 have die pressures of approximately 5,000,000 to 10,000,000 Pa, respectively, at about 20-25° C. Upon heating to 50° C., these materials drop in die pressures to less than 1,000 to 10,000 Pa. The die pressure of the gel of Example 3 at room temperature (approximately 25° C.) or below is similar to or higher than the ceramic batch materials. Thus, it can be an effective cleaning agent for removing the ceramic batch material from the die. It can then be melted and/or flushed from the die by raising the temperature, for example by running the die under 50° C. flowing water. Examples 4 and 5 have die pressures of approximately 10,000,000 Pa, at about 25° C., and they have even higher die pressure as the temperature is lowered. They have higher die pressures than the ceramic batch materials shown in FIG. 1. They can be effective cleaning agents for removing the ceramic paste from the die. The die pressures of Examples 4 and 5 drop to less than 10,000 and 100,000 Pa at 50 and 60° C., respectively. They then can be melted and/or flushed from the die by raising the temperature, for example by running the die under 50-60° C. flowing water.

Figure 2:
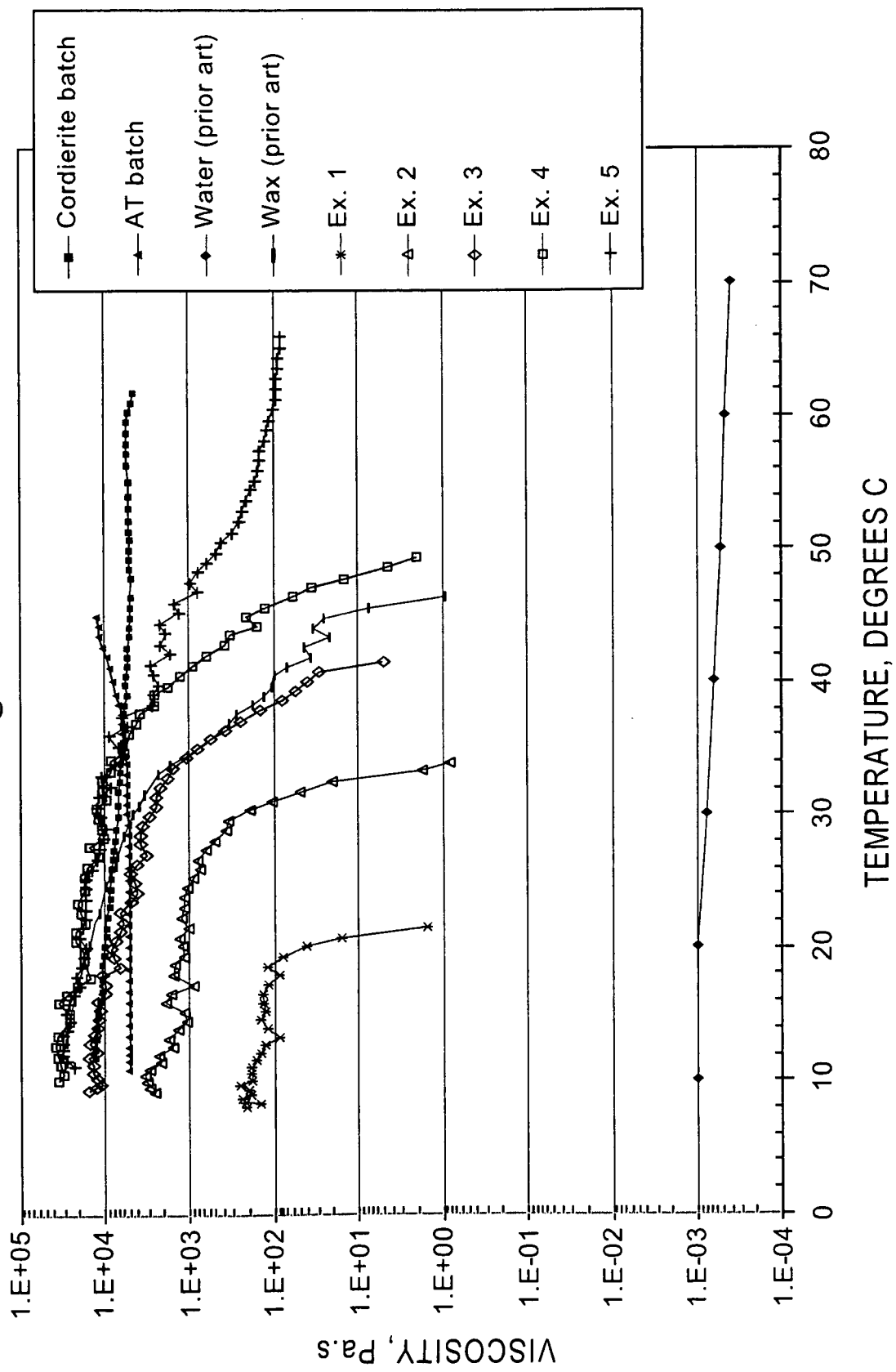
FIG. 2 is a plot of viscosity as a function of temperature for ceramic batch pastes and the gels according to the present disclosure to clean the extrusion dies.

The data in FIG. 2 shows the viscosity versus temperature for the ceramic batch materials ("AT batch" and "Cordierite batch") used to make a ceramic honeycomb body by extrusion of these materials through a die. It is seen that these materials have a relatively flat viscosity of about 5000 to 15,000 Pa-s across a temperature range of about 10 to 60° C. The data in FIG. 2 shows the viscosity of two alternative cleaning materials (water and wax) to remove the ceramic batch from the die. The viscosity of water was taken from the literature and not measured in this study. The viscosity of water is approximately 0.001 Pa-s, while the ceramic batch materials have a viscosity of approximately 1-10 million times greater than water. Thus, again it can be readily seen why water, even when using a high pressure washer, is slow to clean a die filled with ceramic paste. The wax used to clean ceramic batch material from a die is as described above. The data in FIG. 2 shows that the wax has a viscosity of approximately 12,000 Pa-s at 25° C. and drops to about 10 Pa-s at about 45° C.; thus, this characterization method indicates how the wax is able to purge the ceramic batch from the die and then be melted out of the die.

The data in FIG. 2 also shows the viscosity verses temperature results for the gel compositions set forth in Table 1. It can be seen from the data that all of the gels have a relatively high viscosity at the lower temperatures, and viscosity drops significantly as the temperature is raised. Example 2 has a viscosity of approximately 1000 Pa-s at 25° C., and this drops to approximately 1 Pa-s at 35° C. While the viscosity of the gel compositions of Examples 1 and 2 are not as high as the ceramic batch materials shown in FIG. 2, they can be effective cleaning agents for removing the ceramic paste from the die. They can then be melted and/or flushed from the die by raising the temperature, for example by running the die under 50° C. flowing water. Examples 3-5 have viscosities of approximately 4000-5000 and 16,000-20,000 Pa-s, respectively, at about 20-25° C. Upon heating, these materials drop in viscosity to less than 100 Pa-s. The viscosity of the gel composition of Example 3 at room temperature (approximately 25° C.) or below is similar to or higher than the ceramic batch materials. It can be an effective cleaning agent for removing the ceramic paste from the die. It can then be melted and/or flushed from the die by raising the temperature, for example by running the die under 50° C. flowing water. Examples 4 and 5 have viscosities of approximately 16,000-20,000 Pa-s, at about 25° C. and become more viscous as the temperature is lowered. They are more viscous than the ceramic batch materials shown in FIG. 2. They can be effective cleaning agents for removing the ceramic batch material from the die. The viscosities of Examples 4 and 5 drop to less than 10 and 100 Pa-s at 50 and 60° C., respectively. They can then be melted and/or flushed from the die by raising the temperature, for example by running the die under 50-60° C. flowing water.

Example 6

A 40 wt. % gelatin-in-water composition similar to Example 3 in Table 1 was prepared using 8A Technical Gelatin from Milligan & Higgins in water. A 2 inch diameter ceramic extrusion die (900/2:900 cells per square inch, 0.002 inch web thickness) was placed on an extruder through which cordierite ceramic batch material similar to that shown in Table 1 was extruded. The die was then removed from the extruder, and the excess ceramic batch was scrapped with a plastic putty knife. Then, the die was mounted on a hydraulic ram press. The gelatin-in-water composition (approximately 1000 grams) was pressed through the ceramic batch filled die. It was observed that the ceramic batch material flowed as a uniform plug out of the die; the gel then followed the ceramic batch material out of the die, also as a uniform plug. The die was then placed under a sink faucet with hot water (approximately 50-55° C.) running. It was observed by visual inspection that the gel melted and was flushed from the die within several minutes.

A similar die filled with ceramic batch material but without the gel cleaning process took almost one hour to clean using a high pressure water washing system. These results show the advantages of using the presently disclosed gel method over the known methods for cleaning an extrusion die.

Example 7

The procedure of Example 6 was carried out but, instead of the gel composition set forth therein, gel 79672 (as in Example 5 in Table 1) was used. Again, a 2 inch diameter ceramic extrusion die (900/2:900 cells per square inch, 0.002 inch web thickness) was placed on an extruder through which cordierite ceramic batch material similar to that in Table 1 was extruded. The die was then removed from the extruder, the excess ceramic batch was scraped with a plastic putty knife, the die was then mounted on the end of a hydraulic ram press. The Example 5 gel composition (approximately 1000 grams) was pressed through the ceramic batch filled die. It was observed that the ceramic batch flowed as a uniform plug out of the die. The gel followed the ceramic batch out of the die, also as a uniform plug. The die was then placed under a sink faucet with running hot water (approximately 50-55° C.). It was observed by visual inspection that the gel melted and was flushed from the die within about five minutes.

As discussed above, the gel composition may further comprise at least one adjuvant, such as at least one antimicrobial agent such as butylated hydroxytoluene and potassium sorbate. The gel may also be cooled or frozen to less than 0° C. (for example, −20° C.) in order to prevent microbial growth, then thawed (e.g., to room temperature of approximately 15-25° C.) just prior to use. A sample of Example 3 gel (40 weight % gelatin in water) was frozen at −20° C. for 3 days. The gel sample was then allowed to warm back to 25° C. and, as expected, no microbial growth was observed. A portion of this sample was placed in the capillary rheometer; the results showed essentially identical viscosity curves for the gel that was frozen compared to a sample that was freshly made yet never frozen, thus showing that the that gel is rheologically stable to freeze-thaw cycling, which can allow it to be made up in advance and ready for use as required. These results show the advantages of using the presently disclosed method over those known in the art.

What is claimed is:

1. A method for cleaning a ceramic batch material from an extrusion die comprising:
    introducing at least one gel composition that consists essentially of a gelling agent and a solvent wherein the gelling agent is selected from the group consisting of gelatin, agar, pectin, carrageenan, gellan gum, and xanthan gum into the die;
    purging the ceramic batch material from the die;
    rinsing the die with water to melt the gel composition; and
    flushing the melted gel composition from the die.

2. The method of claim 1, wherein the at least one gel composition is water swellable.

3. The method of claim 1, wherein the purging comprises pressing the at least one gel composition through the die.

4. The method of claim 1, wherein a viscosity of the at least one gel composition used to purge the batch material is greater than 100 Pa-s.

5. The method of claim 1, wherein a viscosity of the at least one gel composition used to purge the batch material is greater than 1000 Pa-s.

6. The method of claim 1, wherein a viscosity of the at least one gel composition used to purge the batch material ranges from 1000 Pa-s to 200,000 Pa-s.

7. The method of claim 1, wherein the rinsing lowers the viscosity of the at least one gel composition to less than 100 Pa-s.

8. The method of claim 1, wherein after flushing the melted gel composition from the die, the die is rinsed with at least one solvent.

9. The method of claim 8, wherein the at least one solvent is water.

10. The method of claim 8, wherein after the die is rinsed, the die is substantially clean.

11. A method for cleaning ceramic batch material from an extrusion die comprising introducing at least one water soluble gel composition into the die in a manner sufficient to purge the ceramic batch material from the die, heating the die, and simultaneously or subsequently rinsing the die with water to melt the gel composition, wherein the ratio of the viscosity of the at least one gel composition to that of the ceramic batch material ranges from 0.02 to 100, wherein the gel composition consists essentially of a gelling agent and a solvent and the gelling agent is selected from the group consisting of gelatin, agar, pectin, carrageenan, gellan gum, and xanthan gum.

12. The method of claim 11, wherein after said rinsing the die with water, the die is substantially clean.

13. The method of claim 1, wherein a viscosity of the melted gel composition is less than 1000 Pa-s.

14. The method of claim 1, wherein a temperature of the water is from 50-60° C.

15. The method of claim 1, wherein the at least one gel composition comprises gelatin.

16. The method of claim 1, wherein the gelling agent is gelatin.

* * * * *